Figure 1:
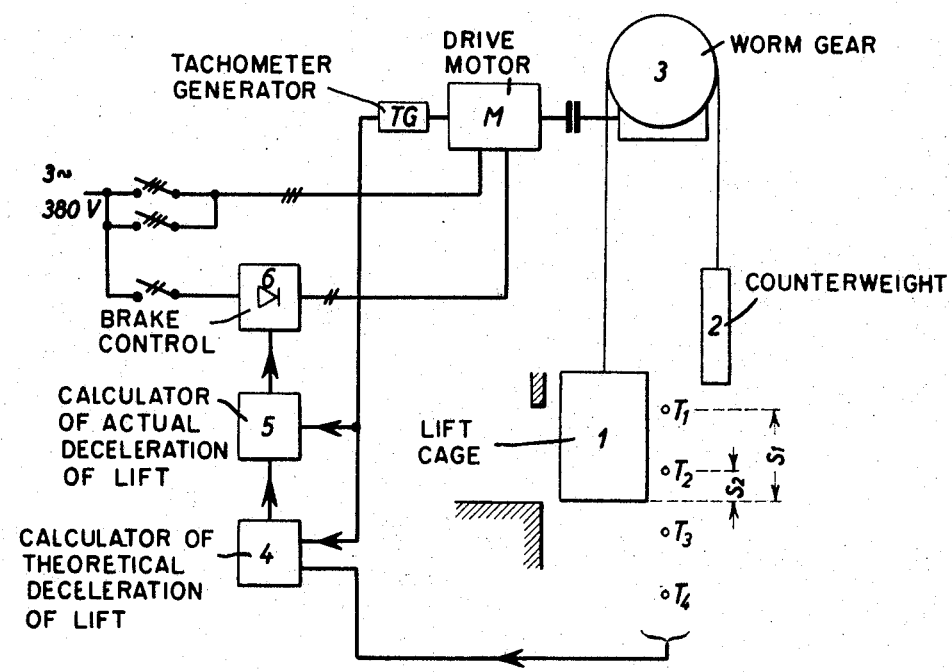

United States Patent

[11] 3,631,326

[72] Inventors Viikko Virkkala
Purjetuulenkuja 11,, Helsinki 85;
Matti Kahkipuro, Espoo, both of Finland
[21] Appl. No. 804,070
[22] Filed Mar. 4, 1969
[45] Patented Dec. 28, 1971
[32] Priority Mar. 8, 1968
[33] Finland
[31] 630/68

[54] LIFT ARREST CONTROL
11 Claims, 4 Drawing Figs.
[52] U.S. Cl. .................................................... 318/140,
187/29, 318/369, 318/466
[51] Int. Cl. ....................................................... H02p 5/22
[50] Field of Search............................................ 318/363,
369, 140, 141, 143, 466; 187/29

[56] References Cited
UNITED STATES PATENTS
3,407,905 10/1968 Gingrich........................ 187/29
2,669,324 2/1954 Lund............................. 187/29

*Primary Examiner*—Benjamin Dobeck
*Assistant Examiner*—K. L. Crosson
*Attorney*—Waters, Roditi, Schwartz & Nissen

ABSTRACT: A method and device for controlling the speed of a lift when the lift is braked is characterized in that a reference or set-point value for controlling the device is dependent upon constant retardation used to stop the lift at a desired level, and that this set-point value is determined at checkpoints to be directly proportional to the square of the lift velocity and inversely proportional to the distance of the checkpoint from the desired stopping level.

LIFT ARREST CONTROL

When the lift speed is 0.5 to 1 m./sec. at a maximum, the lift can be arrested swiftly and accurately enough by comparatively simple braking methods. In faster lifts, however, it is necessary to apply a brake effect which is controlled in one way or another, whereby the braking force must be continuously adjusted, depending on the load and velocity of the lift, etc. Several continuously adjustable braking processes are known, such as: the eddy current brake, braking a squirrel-cage motor by feeding an adjustable direct current into the stator winding, controlling an electromagnet-operated friction brake by means of the magnetizing current, the Ward-Leonard-system.

The practical applications of these and other equivalent methods in lifts differ moreover with respect to the manner in which the governing of the braking force has been made dependent on the velocity, load and position of the lift. Good results have been achieved in practice especially with systems which operate under the principle of velocity control and in which the reference or set-point value of the velocity in the control system changes continuously as a function of the remaining braking distance. These systems have the drawback, however, that the equipment furnishing a continuous velocity set-point or reference value as a function of distance is complex, expensive, and often displays poor reliability in service.

A method and device according to the invention are characterized in that control is accomplished as a control of retardation, and the retardation set-point or reference value is checked with reference to the lift velocity and position normally at two or three points only. In comparison with previously known systems, a solution according to the invention affords the following advantages.

For accurate information on the position of the lift there suffices instantaneous, pointlike, information at two to three points before each stopping level in normal instances. Position signals of this kind are achieved with conventional standard equipment with high reliability and low cost.

From the viewpoint of control technique, retardation control is more easily stabilized than velocity or position control. The system will therefore be a simple one as regards stabilizing equipment.

Figure 2:
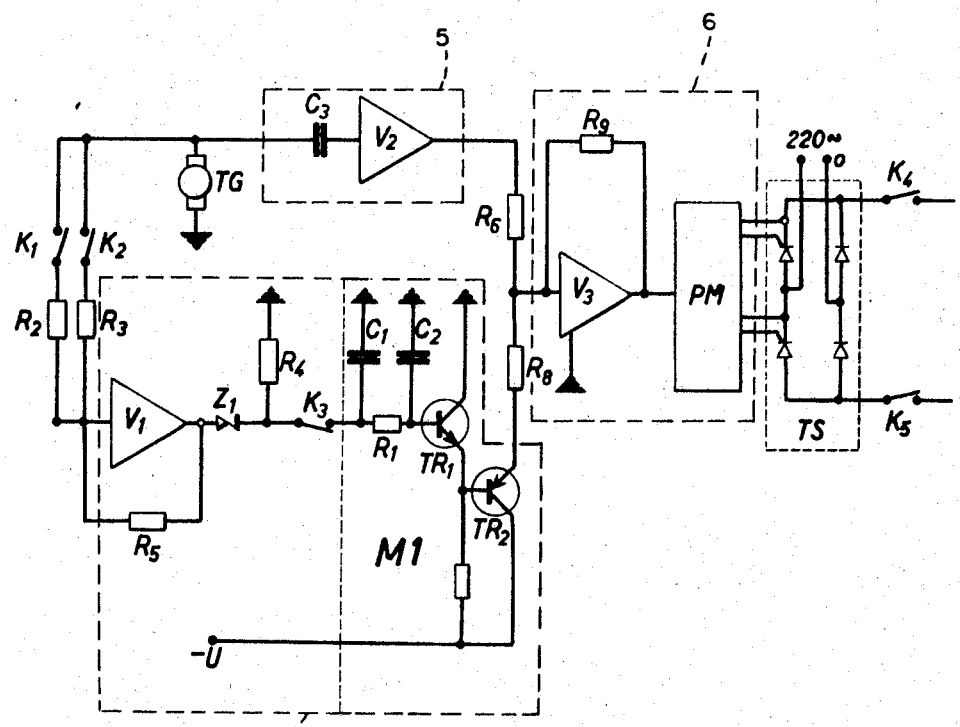
Figure 3:
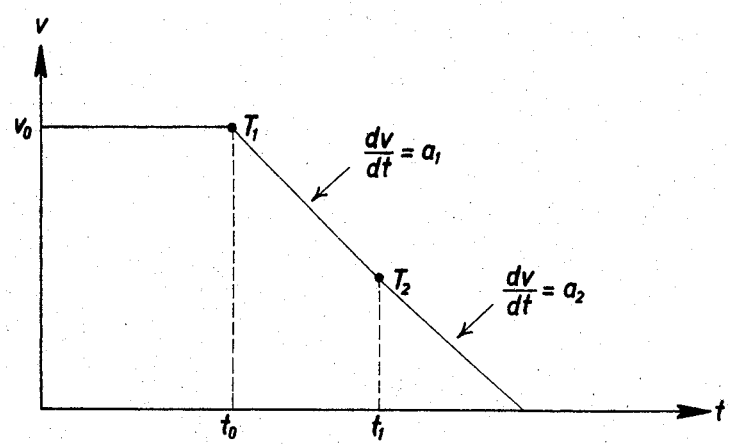
Figure 4:
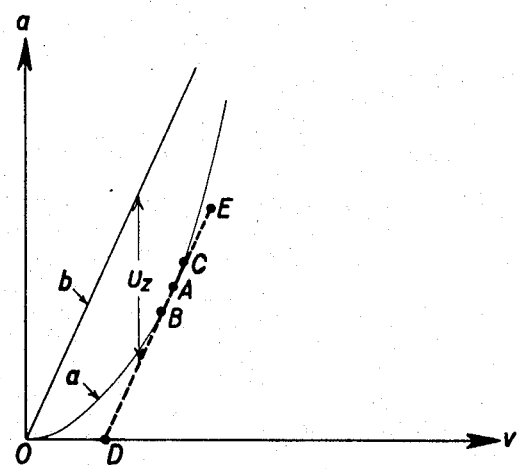

The invention is described in greater detail below with reference to an embodiment, which embodiment is also illustrated by the attached drawings, in which FIG. 1 is a schematic presentation of the components comprised in the lift drive system, FIG. 2 is a circuit diagram, partly in block diagram form, of the control device, FIG. 3 is a graphical presentation of the change of velocity as a function of time in a lift braked according to the invention, and FIG. 4 is a graphical presentation of the requisite retardation, as a function of initial velocity, when the retardation distance up to complete stopping equals a given, known distance.

Referring now in detail to these figures, the principal components of a lift driving system according to the invention as a lift cage is connected to a counterweight 1. A worm gear 3 is interposed between the lift cage 1 and the counterweight 2. A drive motor M is connected to the worm gear 3. A tachometer generator TG is connected to the motor M. Lift position check devices T1—T4 are provided, and in this exemplary instance, four such devices are provided per stopping level. Only the devices belonging to one stopping level have been shown in the drawing. Device 4 is connected to the lift position check devices for calculating the requisite retardation and for retaining it as a reference value for the control amplifier 5.

The control amplifier is provided for measuring the true retardation of the lift from the voltage of the tachometer generator TG, and for comparing it with the reference value obtained from device 4.

A power amplifier 6 is provided for controlling the retardation of the lift.

The lift also includes a conventional mechanical holding brake, which has not been shown in the figures, for the sake of simplicity.

In the case considered as an example, the lift is considered to be braked in a previously known manner, by supplying direct current to an appropriate stator winding of a squirrel-cage motor. Instead of this arrangement also one of the other braking methods mentioned above or some other equivalent method may be used.

The principal components of the control system are shown in greater detail by FIG. 2, in which the following pieces of equipment are shown:

The tachometer generator is connected to an operation amplifier $V_1$ provided for calculating in cooperation with the Zener diode $Z_1$ the required retardation.

An analog memory device $M_1$ is connected to the Zener diode $Z_1$ for storing the calculated reference retardation. Thus, $V_1$, $Z_1$ and $M_1$ correspond to device 4 in FIG. 1.

Resistors $R_2$–$R_5$ are connected as shown for adjusting the voltage from $V_1$ to an appropriate value.

Operation amplifier $V_2$ is connected to the tachometer generator TG for measuring together with condenser $C_3$ the true retardation of the lift.

Resistors $R_6$, $R_8$ are connected as shown for comparison of the value and the true retardation.

Control amplifier $V_3$ is connected to operation amplifier $V_2$ for receiving from resistors $R_8$ a voltage consistent with the difference between the retardation and the reference value, and for forwarding it in appropriate modification to the firing unit PM.

Thyristor bridge TS and firing unit PM are connected to control amplifier $V_3$ as shown.

The course of retardation is shown, in principle, by FIG. 3. The lift approaches with velocity $v_0$ the floor at which it is required to stop. At the moment $t_0$ it arrives at checkpoint $T_1$ (FIG. 1), where the retardation begins. The above-mentioned equipment then swiftly measures the velocity $v_0$ of the lift and forms, in a manner to be described in detail later, the approximate value $a_1 = v_0^2/2S$, of the required retardation. A voltage proportional to this approximate value is stored in condensers $C_1$ and $C_2$, from which it is repeated by transistors $Tr_1$ and $Tr_2$ in such manner than on the emitter of $Tr_2$ at the terminal of resistor $R_8$ there is a voltage of equal magnitude. However, the transistor $Tr_1$ imposes such minimal load on the condensers that their voltage does not change appreciably before the lift arrives at the next checkpoint $T_2$. The other, already previously mentioned pieces of equipment belonging to the system now cause the lift to be retarded at constant retardation $a_1$. Then, when the lift arrives at checkpoint $T_2$, the equipment described above is once more employed to form rapidly the value $a_2 = v_2^2/1S_1$ of the required retardation.

Owing to errors in measurement and control occuring in the interval $T_1$–$T_2$, $a_2$ does not usually exactly equal $a_1$, and the retardation graph of the lift will be slightly angulated, see FIG. 3. If, however, the equipment has been fairly accurately adjusted, the change is not sensed in the lift cage. The resistor $R_1$ also exerts an effect in the same direction. While at the checkpoint the voltage of condenser $C_1$ changes rapidly, the voltage of $C_2$ follows it will delay as a result of the time constant $C_2R_1$, and as a consequence the change in lift retardation also takes place within a small, finite time, instead of an abrupt change.

Final stopping of the lift takes pace in somewhat different ways depending on the particular braking system. In the exemplary case, the direct current braking moment of the motor becomes very small when the velocity approaches zero. The control system at first compensates for this by increasing the magnetizing current until the available voltage no longer permits any further increase. Subsequently, the motor may continue under traction of the load to revolve with very low speed until the holding brake operates. In numerous instances, however, the lift already stops completely during the period of motor braking because the speed of the worm gear becomes so low that the oil films are destroyed and the gear becomes self-arresting. The holding brake is governed with the aid of a conventional time relay to operate after a given time, determined from the passing of checkpoint $T_2$. Even if the lift should not stop completely before the brake operates, the creeping velocity and time can easily be made so small that no objectionable jerk or inaccuracy in the stopping process will result.

Depending on the speed of the lift and on the desired accuracy of stopping, a check of the retardation may furthermore be made at one or two additional points similarly as at point $T_2$.

It is also indicated to pay some attention to the manner in which the set-point value of the retardation is formed. For the required retardation, the well-known equation from the theory of mechanics, concerning motion under constant retardation, is valid.

$a=v^2/2S$, where $v$=velocity at the checkpoint, $a$=the retired retardation and $v_s$=retardation distance, or in the present case the constant distance from the checkpoint to the stopping level.

In FIG. 4, the graph $a$ represents this relationship between velocity and requisite retardation. Let the point A represent the nominal velocity and retardation which are to be expected when the lift arrives at the checkpoint. If the lift arrives at the checkpoint with a velocity which is too high or too low, the corresponding true and requisite values of velocity and retardation are found from the values consistent with points C or B in FIG. 4. It is seen that since at the checkpoints only the applying of correction for minor deviations is concerned, the curve $a$ may be replaced with its tangent D-E without resulting in any appreciable error. A calculation consistent with this tangent is obtained, according to FIGS. 1 and 4, with the aid of the adding operation amplifier $V_1$ and the Zener diode $Z_1$ as described below.

In FIG. 4 a straight line $b$ has been entered, output voltage of operation amplifier $V_1$. From the theory of operational amplifiers it is known that the input voltage of such an amplifier is practically zero. From FIG. 2 one can easily see that the output voltage of the amplifier $V_1$ is $$U_6=R_5/R_2 \cdot U_g$$

if contact $K_1$ is closed, or $$=R_5/R_3 \cdot U_g$$

if contact $K_2$ is closed. $U_g$ is the output voltage of the tachogenerator TG, and thus a direct measure of the velocity of the lift. With the aid of the circuit constants, especially resistor $R_2$ or $R_3$, the line $b$ has been adjusted to be parallel to a particular, desired tangent on the parabola. The voltage received by condenser $C_1$ equals the output voltage of the amplifier subtracted by the constant voltage of the Zener diode, and its graph therefore coincides with the desired tangent, as can be seen from FIG. 4.

The position and velocity magnitudes S and v needed in the control system can be corelated with the corresponding analogous circuit variables in may different ways, depending on the voltages that have been chosen, etc. Such work is simple and previously known in itself and it is not therefore described in this connection. It is essential, however that at the point $T_2$ v and S have entirely different values from those at the point $T_1$ where retardation starts. Prior to commencement of retardation, the contacts $K_1$ and $K_3$ have been closed, whereby the condenser $C_1$ has been charged to a voltage depending on the velocity $v_o$ and the resistance ratio $R_5:R_2$ and which just corresponds to the desired, first retardation. At the start of retardation, these contacts open, but the voltage of the condenser remains virtually unchanged. At the checkpoint $T_2$, contacts $K_2$ and $K_3$ close momentarily, whereby the condenser voltage is corrected to be consistent with the velocity $v_2$ at the time of the check and the resistance ratio $R_5:R_3$. It is now accomplished by proper adjustment of resistor $R_3$ that the circuit operates properly with the new value of the retardation distance S and with the smaller lift velocity. The condenser $C_2$ is small, compared with $C_1$, with the consequence that the slow transfer of the change of voltage to $C_2$ causes no objectionable change in the voltage of $C_1$. The closing and opening of the contacts can easily be arranged to take place when the lift car passes the checkpoints $T_1$ and $T_2$. For instance, the contacts can be placed on relays, which are controlled by magnetic switches or photocell devices in the shaftway.

The operation of the rest of the control system is easily understood by a person familiar with operational amplifiers and feedback control systems. Since the output voltage $U_g$ of the tachogenerator is proportional to the velocity of the lift, the current flowing through $C_3$ is proportional to the rate of change of the velocity and thus a measure of the true retardation of the lift. Amplifier $V_2$ feeds through resistor $R_6$ to the input $V_3$ a current which is proportional to the true retardation. As described before, the transistor $Tr_2$ feeds through $R_8$ to the same point a current which is proportional to the desired retardation, but of different polarity than the current through $R_6$. The input current to $V_3$ is thus proportional to the difference between the desired and true retardations. The control amplifier $V_3$ and the thyristor bridge with its firing unit PM then regulate the braking torque of the motor so that the input to $V_3$ always remains very small. Thus the true retardation very closely follows the desired reference value, with the result that the lift stops at the desired point with a good accuracy.

We claim:

1. A method for controlling the speed of a lift, said method comprising retarding a lift in motion, measuring the actual retardation of the lift at a first point passed by said lift, computing a reference retardation value at said first point required for stopping said lift at a second point, computing the difference between said actual retardation and said reference retardation value, and adjusting said actual retardation to closely correspond to said reference retardation value at a third point between said first and second points.

2. A method as claimed in claim 1 including measuring the actual retardation of the lift at a plurality of successive points between said first and second points, computing a reference retardation value at each of said successive points, computing the difference between said actual retardation and said reference retardation value at each of said successive points, and adjusting said actual retardation between each of said successive points to closely correspond respectively to each said reference retardation value.

3. A method as claimed in claim 1 wherein said reference retardation value is directly proportional to the square of the lift velocity and inversely proportional to the distance between said first and second points.

4. Apparatus for controlling the speed of the lift, said apparatus comprising means for retarding a lift in motion, means for measuring the actual retardation of the lift at a first point passed by said lift, means for computing a reference retardation value at said first point required for stopping said lift at a second point, means for computing the difference between said actual retardation and said reference retardation value, and means for adjusting said actual retardation to closely correspond to said reference retardation value at a third point between said first and second points.

5. Apparatus as claimed in claim 4 including means for measuring the actual retardation of the lift at a plurality of successive points between said first and second points, means for computing a reference retardation value at each of said successive points, means for computing the difference between said actual retardation and said reference retardation value at each of said successive points, and means for adjusting said actual retardation between each of said successive points to closely correspond respectively to each said reference retardation value.

6. Apparatus as claimed in claim 4 including means for storing said reference retardation value upon the computation thereof.

7. Apparatus as claimed in claim 6 wherein said means for measuring the actual retardation of the lift includes a tachometer generator, a condenser and an operational amplifier electrically coupled with one another.

8. Apparatus as claimed in claim 7 wherein said means for computing said reference retardation value includes a further operational amplifier, a Zener diode, and a plurality of resistors electrically coupled with said further operational amplifier, said Zener diode and said tachometer generator.

9. Apparatus as claimed in claim 8 wherein said means for storing said reference retardation value includes an analog memory device electrically coupled with said Zener diode.

10. Apparatus as claimed in claim 9 wherein said means for computing the difference between said actual retardation and said reference retardation value includes a plurality of further resistors electrically coupled with said operational amplifier and said analog memory device.

11. Apparatus as claimed in claim 10 wherein said means for adjusting said actual retardation includes a control amplifier, a thyristor bridge, and a firing device electrically coupled with one another and with said plurality of further resistors.

* * * * *